US012376100B2

(12) United States Patent
Taherzadeh Boroujeni et al.

(10) Patent No.: US 12,376,100 B2
(45) Date of Patent: Jul. 29, 2025

(54) SEMI-PERSISTENT WAVEFORM SWITCHING FOR UPLINK

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Iyab Issam Sakhnini, San Diego, CA (US); Junyi Li, Fairless Hills, PA (US); Wooseok Nam, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 17/658,967

(22) Filed: Apr. 12, 2022

(65) Prior Publication Data

US 2023/0328719 A1   Oct. 12, 2023

(51) Int. Cl.
*H04W 72/1268* (2023.01)
*H04B 7/0413* (2017.01)
*H04L 5/00* (2006.01)
*H04W 72/23* (2023.01)

(52) U.S. Cl.
CPC ....... *H04W 72/1268* (2013.01); *H04L 5/0007* (2013.01); *H04W 72/23* (2023.01); *H04B 7/0413* (2013.01)

(58) Field of Classification Search
CPC .............. H04L 27/0008; H04L 27/264; H04L 27/26526; H04L 27/2636; H04W 72/232; H04W 76/28; H04W 28/20; H04B 7/0617
See application file for complete search history.

(56) References Cited

U.S. PATENT DOCUMENTS

| | | | |
|---|---|---|---|
| 9,300,575 B2 | 3/2016 | Rosenberg et al. | |
| 2018/0288746 A1* | 10/2018 | Zhang | H04L 12/189 |
| 2019/0081770 A1* | 3/2019 | Zhao | H04L 27/2646 |
| 2019/0132824 A1* | 5/2019 | Jeon | H04L 5/0098 |
| 2019/0132862 A1* | 5/2019 | Jeon | H04L 5/0098 |
| 2019/0182812 A1* | 6/2019 | Shimezawa | H04L 5/0094 |
| 2020/0100186 A1* | 3/2020 | Osawa | H04W 52/367 |
| 2020/0196252 A1* | 6/2020 | Osawa | H04W 52/365 |
| 2020/0259612 A1* | 8/2020 | Nakamura | H04L 5/0053 |

(Continued)

FOREIGN PATENT DOCUMENTS

| | | | | |
|---|---|---|---|---|
| WO | WO-2021047973 A1 * | 3/2021 | | H04B 7/0404 |
| WO | WO-2021106837 A1 * | 6/2021 | | H04L 27/0008 |

*Primary Examiner* — Yee F Lam
(74) *Attorney, Agent, or Firm* — Procopio, Cory, Hargreaves & Savitch LLP

(57) ABSTRACT

Method and apparatus for semi-persistent waveform switching for uplink transmissions. The apparatus receives an indication to switch to a first waveform configuration for uplink transmission over a period of time. The apparatus transmits the uplink transmission based on the first waveform configuration during the period of time. The apparatus switches to uplink communication based on the first waveform configuration after a time period following receipt of the indication. The time period comprises a processing time to switch to the first waveform configuration. The apparatus switches to the first waveform configuration for a current BWP in response to reception of the indication.

30 Claims, 10 Drawing Sheets

(56) References Cited

U.S. PATENT DOCUMENTS

| | | | |
|---|---|---|---|
| 2020/0389872 A1* | 12/2020 | Osawa | H04W 72/12 |
| 2021/0152224 A1* | 5/2021 | Osawa | H04B 7/0482 |
| 2022/0053494 A1* | 2/2022 | Shattil | H04L 27/26035 |
| 2022/0078822 A1* | 3/2022 | Myung | H04W 72/0453 |
| 2022/0183012 A1* | 6/2022 | Shahid | H04W 72/53 |
| 2022/0338293 A1* | 10/2022 | Yu | H04W 72/044 |
| 2022/0376965 A1* | 11/2022 | Ramirez-Gutierrez | H04W 72/23 |
| 2022/0400470 A1* | 12/2022 | Kusashima | H04L 5/005 |
| 2022/0405589 A1* | 12/2022 | Sahin | G06N 3/048 |
| 2023/0276416 A1* | 8/2023 | Lai | H04W 72/0453 370/329 |
| 2023/0319900 A1* | 10/2023 | Sayed Hassan | H04L 27/0008 370/329 |
| 2023/0337200 A1* | 10/2023 | Ali | H04W 74/0833 |
| 2024/0023030 A1* | 1/2024 | Taherzadeh Boroujeni | H04L 27/2646 |
| 2024/0155641 A1* | 5/2024 | Taherzadeh Boroujeni | H04W 72/232 |

* cited by examiner

SEMI-PERSISTENT WAVEFORM SWITCHING FOR UPLINK

TECHNICAL FIELD

The present disclosure relates generally to communication systems, and more particularly, to a configuration for semi-persistent waveform switching for uplink transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives an indication to switch to a first waveform configuration for uplink transmission over a period of time. The apparatus transmits the uplink transmission based on the first waveform configuration during the period of time.

In an aspect of the disclosure, a method, a computer-readable medium, and an apparatus are provided. The apparatus may be a device at a network node. The device may be a processor and/or a modem at a network node or the network node itself. The apparatus outputs an indication for a user equipment (UE) to switch to a first waveform configuration for uplink transmission over a period of time. The apparatus obtains the uplink transmission within the period of time and based on the first waveform configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
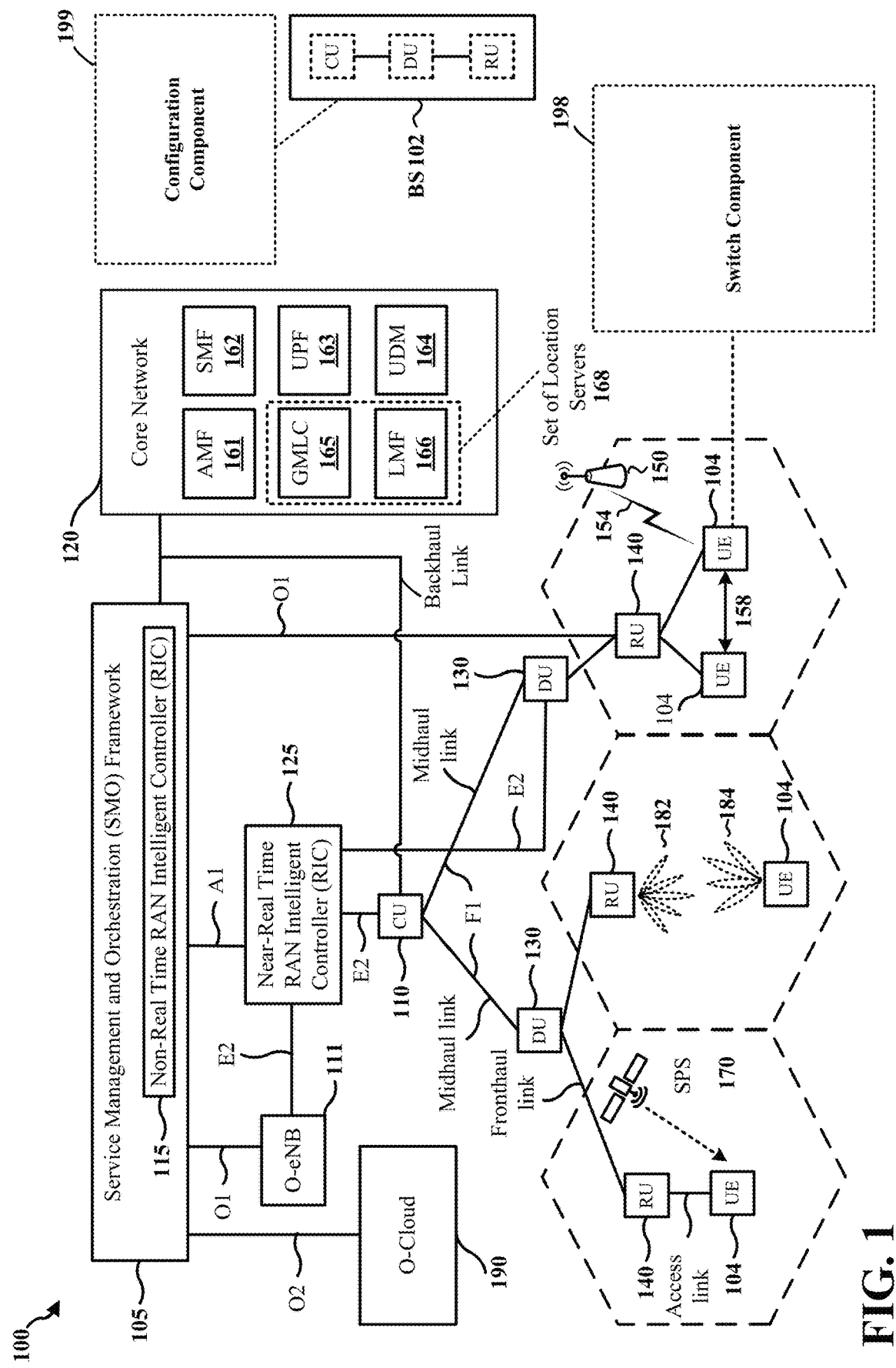
FIG. 1 is a diagram illustrating an example of a wireless communications system and an access network.

In wireless communications, switching between discrete Fourier transform (DFT) spread OFDM (DFT-s-OFDM) or cyclic prefix (CP) orthogonal frequency division multiplexing (OFDM) (CP-OFDM) may be determined by enabling or disabling transform precoding. In some instances, it may be more desirable to use DFT-s-OFDM due to DFT-s-OFDM having a lower peak to average power ratio (PAPR) than CP-OFDM, even though CP-OFDM may be more straight forward to implement in terms of symbol mapping. Waveform indication may be indicated by a scheduling DCI, such that the scheduling DCI that schedules an uplink transmission may also indicate the waveform that should be used for that uplink transmission. However, such scheduling DCI may include a new uplink DCI bit field for uplink scheduling to indicate the waveform.

Aspects presented herein provide a configuration to allow for the dynamically indicate a waveform for uplink transmission to be applied in a semi-persistent manner. The aspects presented herein may allow a UE to enable or disable a transform precoding based on a dynamic indication from a network entity. For example, the UE may switch to a specific waveform configuration for uplink transmission for a period of time in response to an indication from the network entity.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a switch component 198 configured to receive an indication to switch to a first waveform configuration for uplink transmission over a period of time; and transmit the uplink transmission based on the first waveform configuration during the period of time.

Referring again to FIG. 1, in certain aspects, the base station 102 may include a configuration component 199 configured to output an indication for a UE to switch to a first waveform configuration for uplink transmission over a period of time; and obtain the uplink transmission within the period of time and based on the first waveform configuration.

Although the following description may be focused on 5G NR, the concepts described herein may be applicable to other similar areas, such as LTE, LTE-A, CDMA, GSM, and other wireless technologies.

Figure 2:
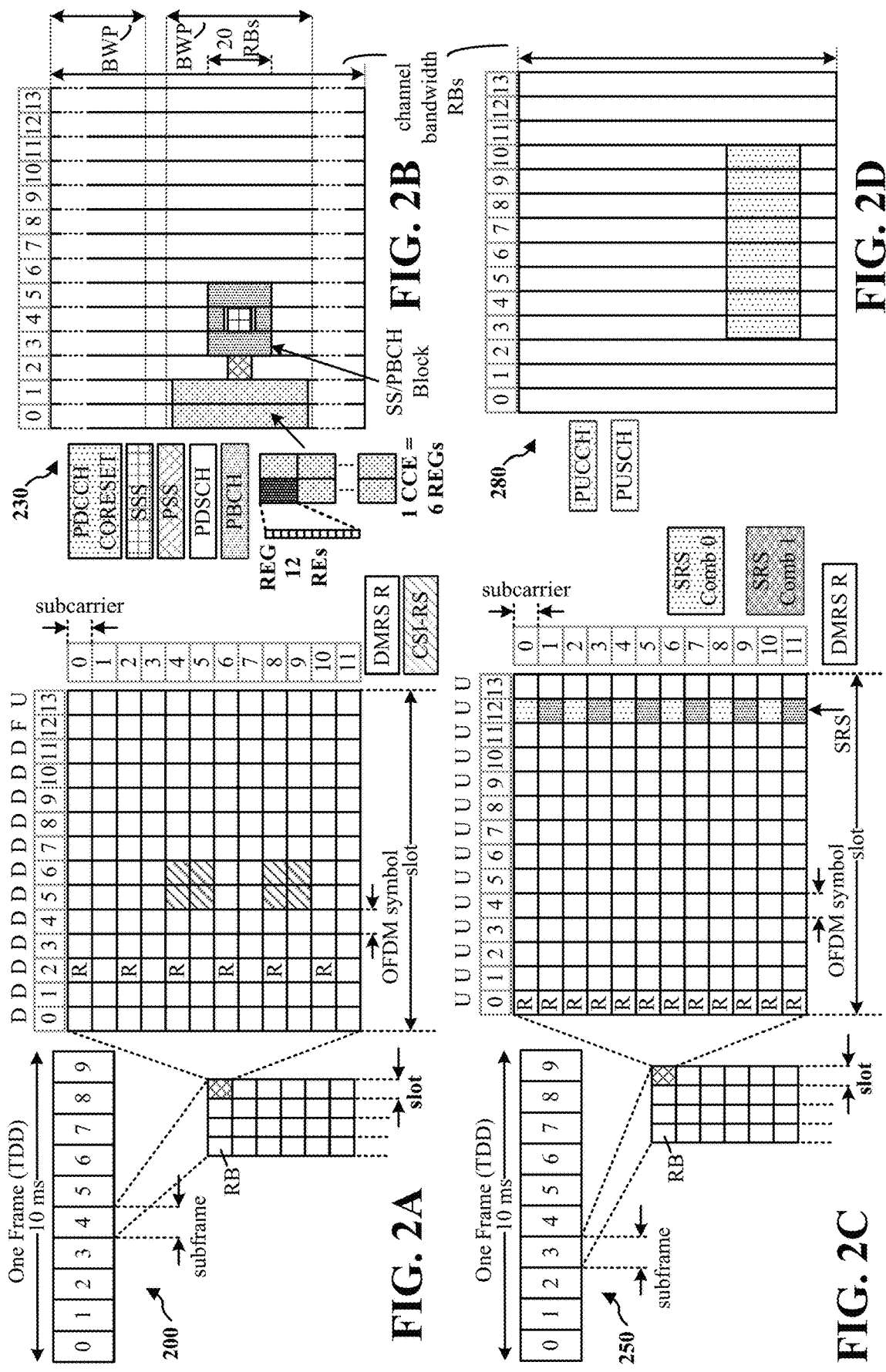
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms)

may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
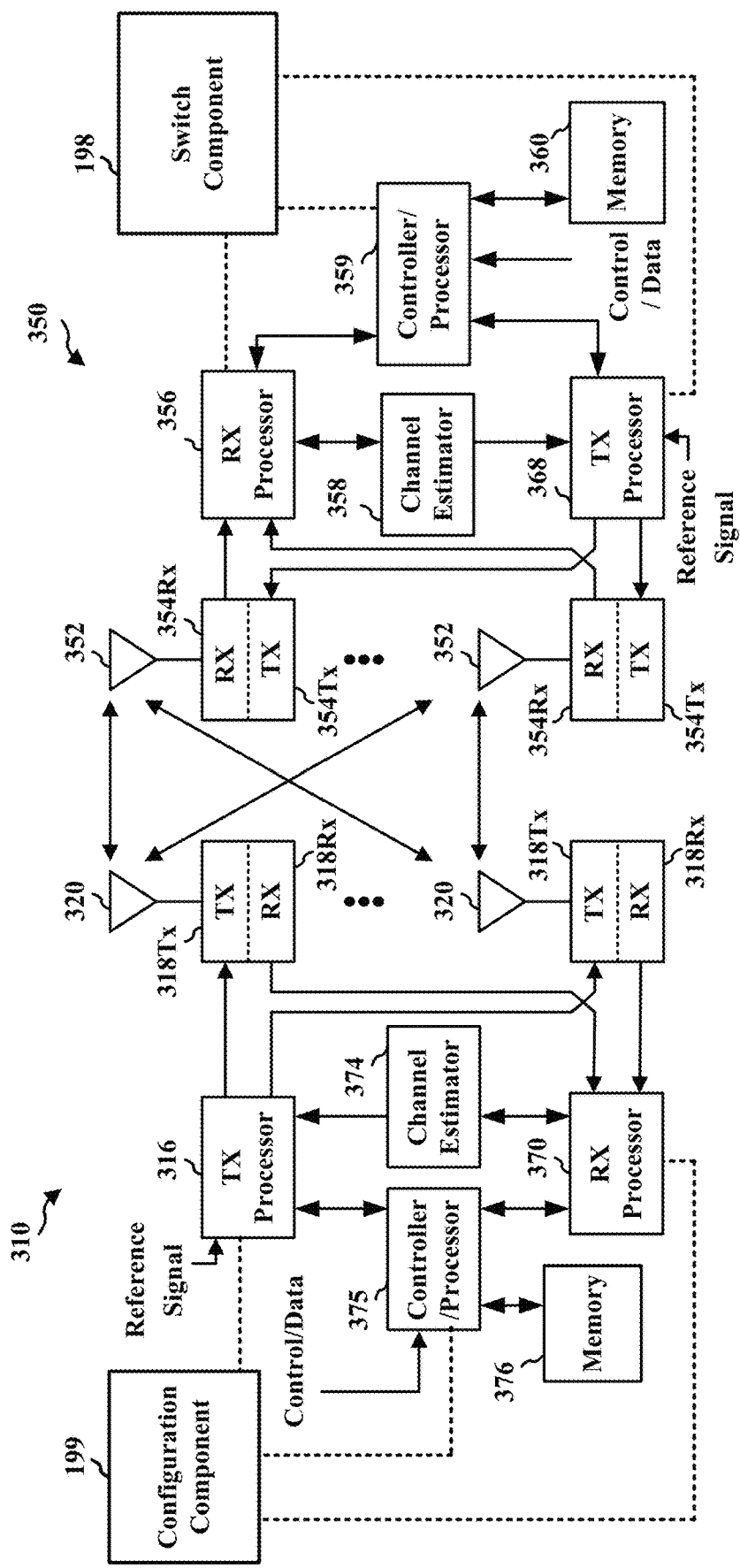
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the switch component 198 of FIG. 1.

At least one of the TX processor 316, the RX processor 370, and the controller/processor 375 may be configured to perform aspects in connection with the configuration component 199 of FIG. 1.

In wireless communications, switching between DFT-s-OFDM or CP-OFDM may be determined by enabling or disabling transform precoding (e.g., based on a transform precoding parameter such as "RACH-ConfigCommon.msg3-transformPrecoding" for random access or "PUSCH-Config.transformPrecoding" for PUSCH in RRC-connected mode). CP-OFDM, in comparison to DFT-s-OFDM, may be more straight forward in terms of symbol mapping, but has a higher PAPR than DFT-s-OFDM. As such, in some instances, it may be more desirable to use DFT-s-OFDM due to DFT-s-OFDM having a lower PAPR than CP-OFDM, even though CP-OFDM may be more straight forward to implement in terms of symbol mapping.

A waveform indication may be indicated by a scheduling DCI, such that the scheduling DCI that schedules an uplink transmission may also indicate the waveform to be used for that uplink transmission. Such scheduling DCI may include a new uplink DCI bit field for uplink scheduling in order to indicate the waveform.

Aspects presented herein provide a configuration to allow for the dynamical indication of a waveform for uplink transmission, the waveform to be applied in a semi-persistent manner, such as a for a period of time. The aspects presented herein may allow a UE to enable or disable a transform precoding based on a dynamic indication from a network entity. For example, the UE may switch to a specific waveform configuration for uplink transmissions for a period of time in response to an indication from the network entity. At least one advantage of the disclosure is that the UE may change to use of a particular waveform for uplink transmissions during a period of time or until an indication for a semi-static waveform is overwritten based on the UE receiving an additional indication from the network entity.

In some instances, the network entity may indicate (e.g., dynamically indicate) to the UE to enable or disable transform precoding for a period of time or until overwritten by a subsequent indication. For example, the indication may indicate the UE to switch between DFT-s-OFDM or CP-OFDM for uplink transmissions. As an example, the network entity may indicate to the UE to switch to use DFT-s-OFDM for transmissions during a period of time. As another example, the network entity may indicate to the UE to switch to use CP-OFDM for transmissions during a period of time. In some aspects, the dynamic indication may be comprised within a group common DCI to a group of UEs including the UE. In some aspects, the dynamic indication may be included in a UE-specific DCI directed to a particular UE. In some aspects, the dynamic indication may be included in a downlink MAC-CE. In some aspects, the dynamic indication of waveform switching or dynamic enabling/disabling of transform precoding that is not for semi-static application may override a semi-static configuration of enabling/disabling of transform precoding or a dynamic indication of a waveform that is to be applied in a semi-static manner over a period of time. As an example, if the UE receives an indication in DCI or a MAC-CE to use a first waveform for a period of time (e.g., in a semi-static manner), and the UE receives a second indication in DCI or a MAC-CE to use a second waveform in a dynamic manner, the UE may apply the second waveform.

The dynamic indication for semi-static application of a waveform may expire after a period of time (e.g., which may be referred to as a time window of validity for the indication), such that expiration of period of time/time window for the dynamic indication results in the UE returning or resuming transmissions based on a prior waveform, such as a semi-static configuration of transform precoding. In some instances, the time window of validity may be preconfigured. In some instances, the time window of validity may be configured via RRC signaling. In some instances, the network may indicate the time window of validity together with or as a part of the dynamic indication of waveform switching. In some instances, the time window of validity may be configured or indicated in terms of a number of time slots, OFDM symbols, absolute time, or another time period.

The UE may apply (e.g., transmit using) the dynamic indication of the semi-persistent waveform switching after a predefined or preconfigured time period following receipt of the indication. For example, the indication may be implemented or applied after a corresponding processing time, which accounts for the amount of time or a time period the UE utilizes for processing the dynamic indication. In some instances, the processing time for semi-persistent waveform switching may be configured for the UE or indicated in terms of a number of time slots, OFDM symbols, or absolute time.

In some instances, the dynamic indication of the semi-persistent waveform switching may be valid for a subset of uplink data transmission. For example, the indication may be applied to a configured grant based on the configuration of the configured grant. In some instances, the configuration of the configured grant may determine whether the transform precoding may be switched by a dynamic indication.

In some instances, waveform switching may be applied based on whether the uplink transmission is a single layer or a multi-layer multiple input multiple output (MIMO), which may be predefined or configured by the network entity (e.g., via RRC signaling). In some aspects, the switching of the waveform may be linked to a change of uplink transmission parameters, such as but not limited to demodulation reference signal (DMRS), phase tracking (PTRS), contiguous RB allocation, or the like. In some instances, the waveform switching indication may be valid for a current BWP. In some instances, the network entity may expect to receive an acknowledgement (ACK) from the UE for the waveform switching indication before activation of the waveform switching. In such instances, the timing of the activation of the waveform switching indication may be based on or connected to the time of the transmission of the ACK by the UE to the network entity. The ACK may be comprised within a PUCCH or other uplink transmission from the UE to the network entity.

Figure 4:
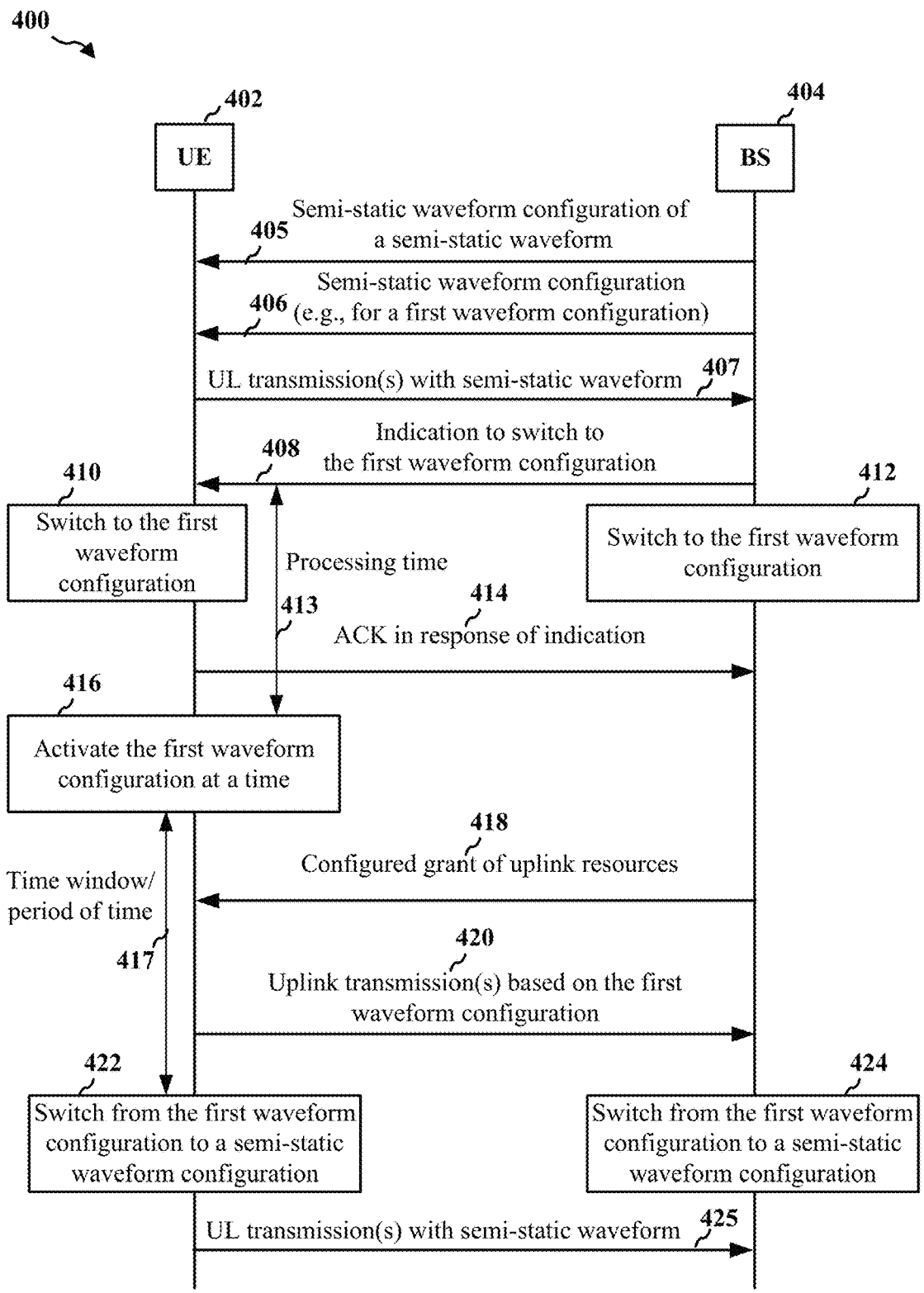
FIG. 4 a call flow diagram of signaling between a UE and a network entity.

FIG. 4 is a call flow diagram 400 of signaling between a UE 402 and a network entity (e.g., base station or a component of a base station such as a CU, DU, or RU) 404. The UE 402 may be configured to communicate with the base station 404. For example, in the context of FIG. 1, the base station 404 may correspond to base station 102. Further, a UE 402 may correspond to at least UE 104. In another example, in the context of FIG. 3, the base station 404 may correspond to base station 310 and the UE 402 may correspond to UE 350.

At 406, the base station 404 may output (e.g., transmit or provide) a semi-static waveform configuration 406, e.g., in RRC signaling, prior to outputting (e.g., transmitting or providing) an indication for the UE to switch to a first waveform configuration, at 408. The base station 404 my output (e.g., transmit) the semi-static waveform configuration to the UE 402. The UE 402 may receive the semi-static waveform configuration from the base station 404. The UE may receive the first semi-static waveform configuration prior to receiving an indication to switch to a first waveform configuration, at 408. In some aspects, the first waveform may expire after a duration of time. In some aspects, the UE may receive a semi-static indication 405 to apply a different waveform, e.g., which may be referred to as a semi-static waveform, a semi-statically indicated waveform, or a second waveform. The semi-static indication may be different than a dynamic indication, as shown at 408. As illustrated at 407, the UE may transmit uplink transmissions using the semi-statically indicated waveform, as indicated at 405.

At 408, the base station 404 may output an indication for the UE 402 to switch to a first waveform configuration for uplink transmission over a period of time. The UE 402 may receive the indication to switch to the first waveform configuration from the base station 404. In some aspects, the indication may be comprised within a group common DCI, a UE-specific DCI, or a medium access control (MAC) control element (CE) (MAC-CE). In some aspects, the first waveform configuration may comprise at least one of a filtering configuration or a pulse shape. In some aspects, the indication may comprise an enabling or disabling of a transform precoding. The first waveform configuration may be for cyclic prefix orthogonal frequency division multiplexing (CP-OFDM) or DFT-s-OFDM. The first waveform configuration may be associated with a subset of uplink transmissions. The first waveform configuration may be associated with a single layer MIMO or a multi-layer MIMO. In some aspects, the first waveform configuration may be associated with a current BWP.

At 410, the UE 402 may switch to the first waveform configuration, e.g., switching from the semi-statically indicated waveform to the dynamically indicated first waveform for a period of time. For example, the UE may switch to uplink communication based on the first waveform configuration. The UE may switch to the uplink communication based on the first waveform configuration after a time period 413 following receipt of the indication. The time period may comprise a processing time to switch to the first waveform configuration. In another example, the UE may switch to the first waveform configuration for a current bandwidth part (BWP) in response to reception of the indication.

At 412, the base station 404 may switch to reception of uplink communication based on the first waveform configuration. The base station may switch to reception of uplink communication based on the first waveform configuration after a time period following the indication. In some aspects, the time period may comprise a processing time, e.g., time period 413, to switch to the first waveform configuration.

At 414, the UE 402 may transmit an acknowledgement (ACK) in response to the indication. The UE may transmit the ACK to the base station 404. The base station 404 may receive the ACK from the UE 402. The UE may transmit the ACK in response to the indication comprising the first waveform configuration.

At 416, the UE 402 may activate the first waveform configuration. In some aspects, the time period 413 may be an activation time based on the transmission of the ACK until the activation at 416 rather than from the indication at 408 to the activation at 416. For example, UE may activate the first waveform configuration at a time based on the transmission of the acknowledgement.

At 418, the base station 404 may output a configured grant of uplink resources. The UE may receive the configured grant of uplink resources from the base station. The UE may receive the configured grant of uplink resources based on the first waveform configuration. In some aspects, the UE may transmit an uplink transmission using one or more uplink resources of the configured grant and with the first waveform configuration based on the uplink transmission corresponding to a subset of uplink transmissions or based on an indication in the configured grant configured to enable waveform switching or transform precoding switching.

At 420, the UE 402 may transmit uplink transmission(s) based on the first waveform configuration. The base station 404 may obtain the uplink transmission from the UE 402. The UE transmits the uplink transmission based on the first waveform configuration during the period of time, e.g., 417. In some aspects, transmitting the uplink transmission based on the first waveform configuration may include transmitting the uplink transmission with a change of one or more uplink transmission parameters. The one or more uplink transmission parameters may include at least one of a demodulation reference signal parameter, a phase tracking reference signal configuration, or a contiguous resource block allocation.

At 422, the UE 402 may switch from the first waveform configuration to the semi-static waveform configuration. The UE switching from the first waveform configuration to the semi-static waveform configuration upon expiration of the duration of time, e.g., 417. At 424, the base station 404 may switch from receiving the uplink transmission based on the first waveform configuration to the semi-static waveform configuration. The base station may switch from receiving the uplink transmission based on the first waveform configuration to the semi-static waveform configuration upon expiration of the duration of time. The UE may transmit uplink transmissions to the base station, at 425, based on the semi-statically configured waveform, e.g., rather than the first waveform configuration. In some aspects, the duration of time may be preconfigured, configured via RRC signaling, or indicated within the indication. In some aspects, the duration of time may be comprised of at least one of at least one time slot, at least one OFDM symbol, or an absolute period of time.

Figure 5:
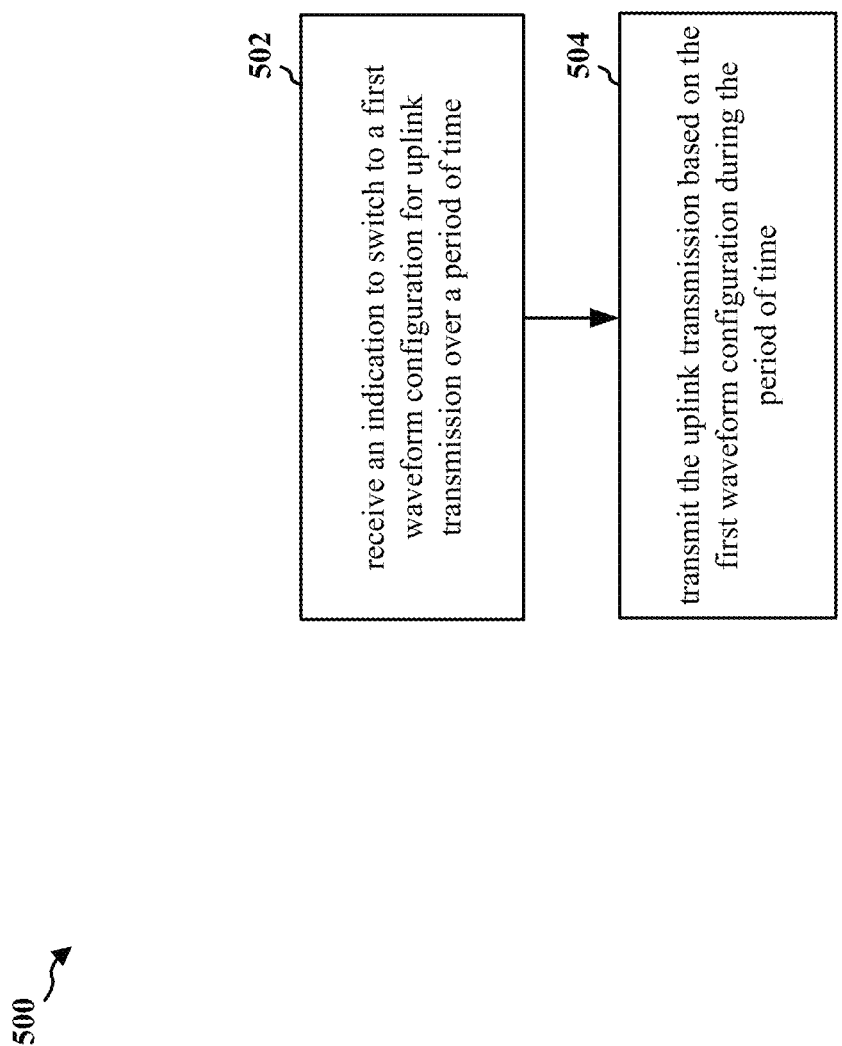
FIG. 5 is a flowchart of a method of wireless communication.

FIG. 5 is a flowchart 500 of a method of wireless communication. The method may be performed by a UE (e.g., the UE 104; the apparatus 704). One or more of the illustrated operations may be omitted, transposed, or contemporaneous. The method may allow a UE to enable or disable transform precoding based on a dynamic indication from a network entity.

At 502, the UE receives an indication to switch to a first waveform configuration for uplink transmission over a period of time. For example, 502 may be performed by switch component 198 of apparatus 704. In some aspects, the indication may be received in a group common DCI, a UE-specific DCI, or a MAC-CE. In some aspects, the first waveform configuration may comprise at least one of a filtering configuration or a pulse shape. In some aspects, the indication may comprise an enabling or disabling of a transform precoding. The first waveform configuration may be for CP-OFDM or DFT-s-OFDM. The first waveform configuration may be associated with a subset of uplink transmissions. The first waveform configuration may be associated with a single layer MIMO or a multi-layer MIMO.

At 504, the UE transmits the uplink transmission based on the first waveform configuration. For example, 504 may be performed by switch component 198 of apparatus 704. The UE transmits the uplink transmission based on the first waveform configuration during the period of time. In some aspects, transmitting the uplink transmission based on the first waveform configuration may include transmitting the uplink transmission with a change of one or more uplink transmission parameters. The one or more uplink transmission parameters may include at least one of a demodulation reference signal parameter, a phase tracking reference signal configuration, or a contiguous resource block allocation.

Figure 6:
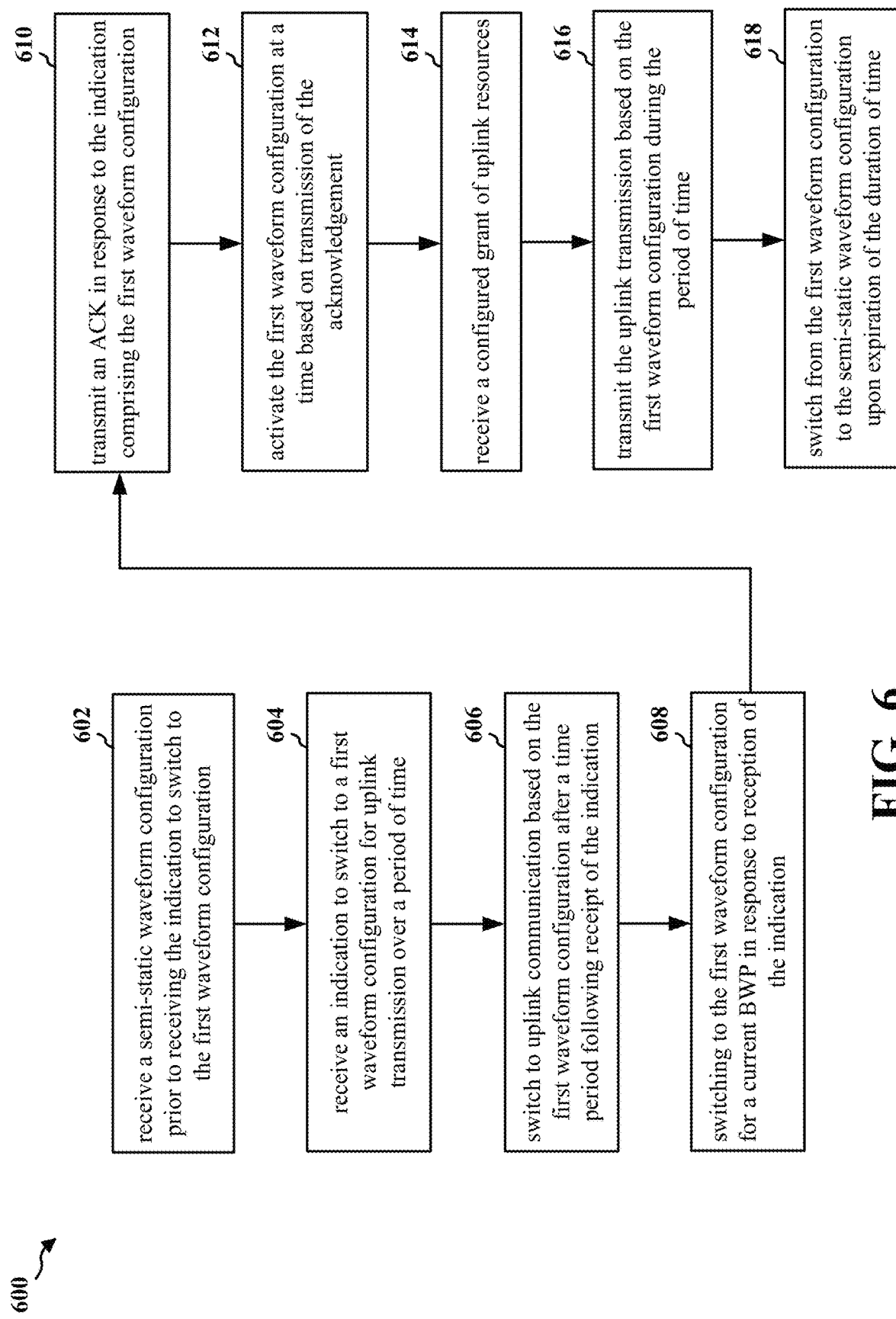
FIG. 6 is a flowchart of a method of wireless communication.

FIG. 6 is a flowchart 600 of a method of wireless communication. The method may be performed by a UE (e.g., the UE 104; the apparatus 704). One or more of the illustrated operations may be omitted, transposed, or contemporaneous. The method may allow a UE to enable or disable transform precoding based on a dynamic indication from a network entity.

At 602, the UE may receive a semi-static waveform configuration. For example, 602 may be performed by switch component 198 of apparatus 704. The UE may receive the semi-static waveform configuration prior to receiving an indication to switch to a first waveform configuration. In some aspects, the first waveform configuration may be configured to expire after a duration of time.

At 604, the UE receives an indication to switch to a first waveform configuration for uplink transmission over a period of time. For example, 604 may be performed by switch component 198 of apparatus 704. In some aspects, the indication may be received in a group common DCI, a UE-specific DCI, or a MAC-CE. In some aspects, the first waveform configuration may comprise at least one of a filtering configuration or a pulse shape. In some aspects, the indication may comprise an enabling or disabling of a transform precoding. The first waveform configuration may be for CP-OFDM or DFT-s-OFDM. The first waveform configuration may be associated with a subset of uplink transmissions. The first waveform configuration may be associated with a single layer MIMO or a multi-layer MIMO.

At 606, the UE may switch to uplink communication based on the first waveform configuration. For example, 606 may be performed by switch component 198 of apparatus 704. The UE may switch to the uplink communication based on the first waveform configuration after a time period following receipt of the indication. The time period may comprise a processing time to switch to the first waveform configuration.

At 608, the UE may switch to the first waveform configuration for a current BWP. For example, 608 may be performed by switch component 198 of apparatus 704. The UE may switch to the first waveform configuration for the current BWP in response to reception of the indication.

At 610, the UE may transmit an ACK in response to the indication. For example, 610 may be performed by switch component 198 of apparatus 704. The UE may transmit the ACK in response to the indication comprising the first waveform configuration. The UE may transmit the ACK to the network entity.

At 612, the UE may activate the first waveform configuration. For example, 612 may be performed by switch component 198 of apparatus 704. The UE may activate the first waveform configuration at a time based on the transmission of the acknowledgement.

At 614, the UE may receive a configured grant of uplink resources. For example, 614 may be performed by switch component 198 of apparatus 704. The UE may receive the configured grant of uplink resources from the network entity. The UE may receive the configured grant of uplink resources based on the first waveform configuration. In some aspects, the UE may transmit an uplink transmission using one or more uplink resources of the configured grant and with the first waveform configuration based on the uplink transmission corresponding to a subset of uplink transmissions or based on an indication in the configured grant configured to enable waveform switching or transform precoding switching.

At 616, the UE transmits the uplink transmission based on the first waveform configuration. For example, 616 may be performed by switch component 198 of apparatus 704. The UE transmits the uplink transmission based on the first waveform configuration during the period of time. In some aspects, transmitting the uplink transmission based on the first waveform configuration may include transmitting the uplink transmission with a change of one or more uplink transmission parameters. The one or more uplink transmission parameters may include at least one of a demodulation reference signal parameter, a phase tracking reference signal configuration, or a contiguous resource block allocation.

At 618, the UE may switch from the first waveform configuration to the semi-static waveform configuration. For example, 618 may be performed by switch component 198 of apparatus 704. The UE switching from the first waveform configuration to the semi-static waveform configuration upon expiration of the duration of time. In some aspects, the duration of time may be preconfigured, configured via RRC signaling, or indicated within the indication. The duration of time may be comprised of at least one of at least one time slot, at least one orthogonal frequency division multiplexing (OFDM) symbol, or an absolute period of time.

Figure 7:
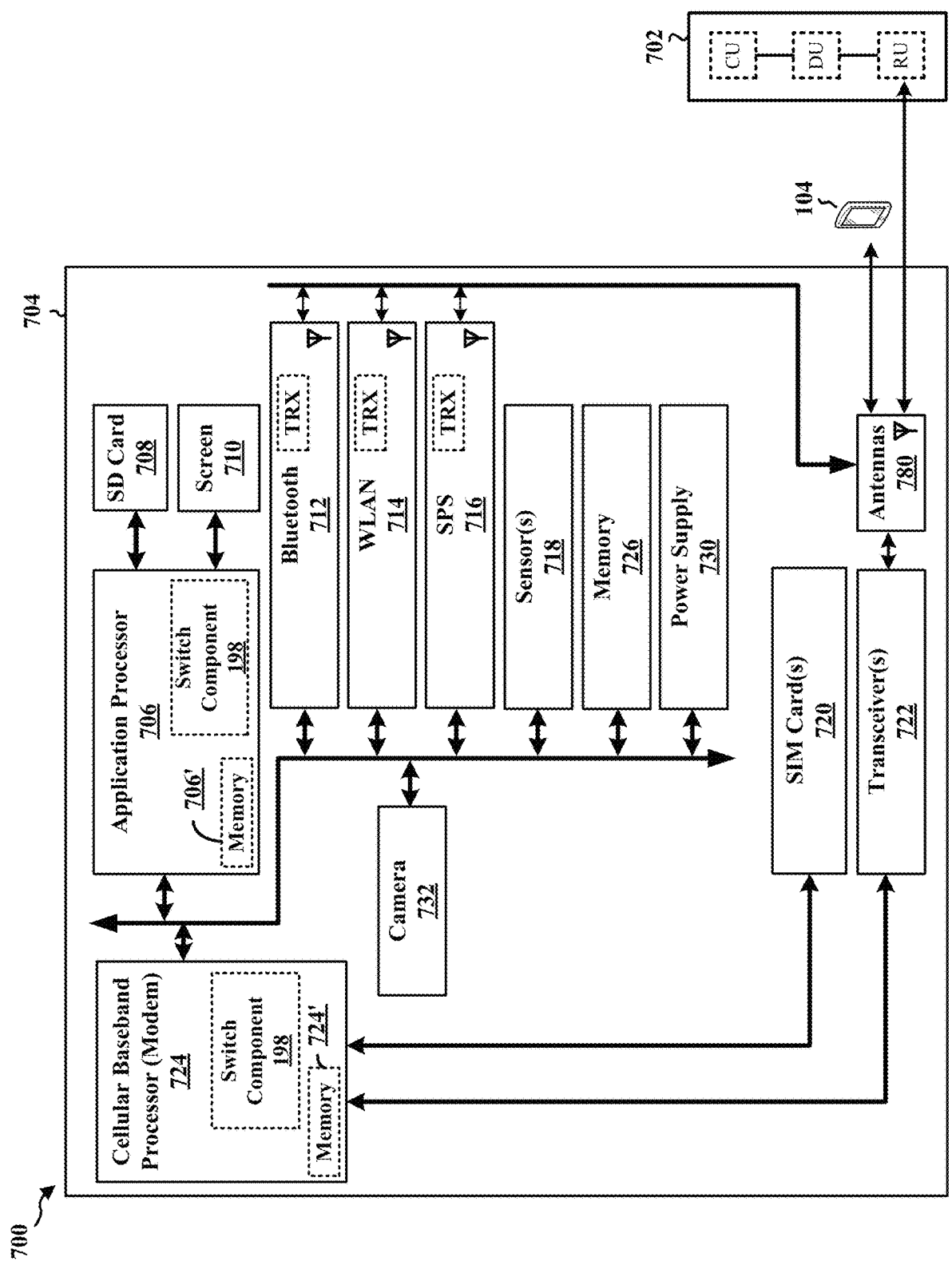
FIG. 7 is a diagram illustrating an example of a hardware implementation for an example apparatus and/or network entity.

FIG. 7 is a diagram 700 illustrating an example of a hardware implementation for an apparatus 704. The apparatus 704 may be a UE, a component of a UE, or may implement UE functionality. In some aspects, the apparatus 704 may include a cellular baseband processor 724 (also referred to as a modem) coupled to one or more transceivers 722 (e.g., cellular RF transceiver). The cellular baseband processor 724 may include on-chip memory 724'. In some aspects, the apparatus 704 may further include one or more subscriber identity modules (SIM) cards 720 and an application processor 706 coupled to a secure digital (SD) card 708 and a screen 710. The application processor 706 may include on-chip memory 706'. In some aspects, the apparatus 704 may further include a Bluetooth module 712, a WLAN module 714, an SPS module 716 (e.g., GNSS module), one or more sensor modules 718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 726, a power supply 730, and/or a camera 732. The Bluetooth module 712, the WLAN module 714, and the SPS module 716 may include an on-chip transceiver (TRX) (or in some cases, just a receiver (RX)). The Bluetooth module 712, the WLAN module 714, and the SPS module 716 may include their own dedicated antennas and/or utilize the antennas 780 for communication. The cellular baseband processor 724 communicates through the transceiver(s) 722 via one or more antennas 780 with the UE 104 and/or with an RU associated with a network entity 702. The cellular baseband processor 724 and the application processor 706 may each include a computer-readable medium/memory 724', 706', respectively. The additional memory modules 726 may also be considered a computer-readable medium/memory. Each computer-readable medium/memory 724', 706', 726 may be non-transitory. The cellular baseband processor 724 and the application processor 706 are each responsible for general processing, including the execution of software stored on the computer-readable medium/memory. The software, when executed by the cellular baseband processor 724/application processor 706, causes the cellular baseband processor 724/application processor 706 to perform the various functions described supra. The computer-readable medium/memory may also be used for storing data that is manipulated by the cellular baseband processor 724/application processor 706 when executing software. The cellular baseband processor 724/application processor 706 may be a component of the UE 350 and may include the memory 360 and/or at least one of the TX processor 368, the RX processor 356, and the controller/processor 359. In one configuration, the apparatus 704 may be a processor chip (modem and/or application) and include just the cellular baseband processor 724 and/or the application processor 706, and in another configuration, the apparatus 704 may be the entire UE (e.g., see 350 of FIG. 3) and include the additional modules of the apparatus 704.

As discussed supra, the component 198 is configured to receive an indication to switch to a first waveform configuration for uplink transmission over a period of time; and transmit the uplink transmission based on the first waveform configuration during the period of time. The component 198 may be within the cellular baseband processor 724, the application processor 706, or both the cellular baseband processor 724 and the application processor 706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 704 may include a variety of components configured for various functions. In one configuration, the apparatus 704, and in particular the cellular baseband processor 724 and/or the application processor 706, includes means for receiving an indication to switch to a first waveform configuration for uplink transmission over a period of time. The apparatus includes means for transmitting the uplink transmission based on the first waveform configuration during the period of time. The apparatus further includes means for receiving a semi-static waveform configuration prior to receiving the indication to switch to the first waveform configuration. The first waveform configuration is configured to expire after a duration of time. The apparatus further includes means for switching from the first waveform configuration to the semi-static waveform configuration upon expiration of the duration of time. The apparatus further includes means for switching to uplink communication based on the first waveform configuration after a period of time following receipt of the indication. The time period comprises a processing time to switch to the first waveform configuration. The apparatus further includes means for receiving a configured grant of uplink resources. The apparatus further includes means for transmitting the uplink transmission using one or more uplink resources of the configured grant and with the first waveform configuration based on the uplink transmission corresponding to the subset of uplink transmissions or based on an indication in the configured grant enabling waveform switching or transform precoding switching. The apparatus further includes means for switching to the first waveform configuration for a current BWP in response to reception of the indication. The apparatus further includes means for transmitting an acknowledgement in response to the indication comprising the first waveform configuration. The apparatus further includes means for activating of the first waveform configuration at a time based on transmission of the acknowledgement. The means may be the component 198 of the apparatus 704 configured to perform the functions recited by the means. As described supra, the apparatus 704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 8:
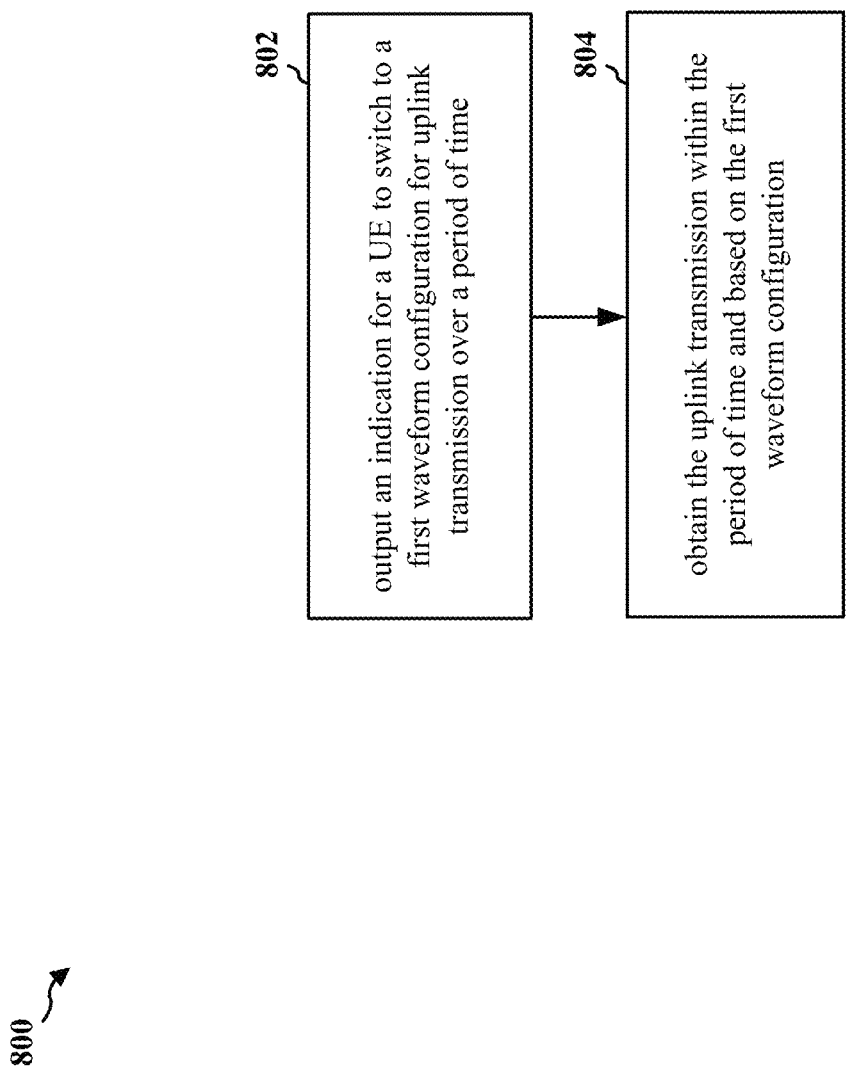
FIG. 8 is a flowchart of a method of wireless communication.

FIG. 8 is a flowchart 800 of a method of wireless communication. The method may be performed by a base station (e.g., the base station 102; the network entity 1002. One or more of the illustrated operations may be omitted, transposed, or contemporaneous. The method may allow a network entity to dynamically indicate a UE to enable or disable transform precoding.

At 802, the network entity may output an indication for a user equipment (UE) to switch to a first waveform configuration for uplink transmission over a period of time. For example, 802 may be performed by configuration component 199 of network entity 1002. In some aspects, the indication may be comprised within a group common DCI, a UE-specific DCI, or a MAC-CE. In some aspects, the first waveform configuration may comprise at least one of a filtering configuration or a pulse shape. In some aspects, the indication may comprise an enabling or disabling of a transform precoding. The first waveform configuration may be for CP-OFDM or DFT-s-OFDM. The first waveform configuration may be associated with a subset of uplink transmissions. The first waveform configuration may be associated with a single layer MIMO or a multi-layer MIMO. In some aspects, the first waveform configuration may be associated with a current BWP.

At 804, the network entity may obtain the uplink transmission within the period of time. For example, 804 may be performed by configuration component 199 of network entity 1002. The network entity may obtain the uplink transmission within the period of time and based on the first waveform configuration.

Figure 9:
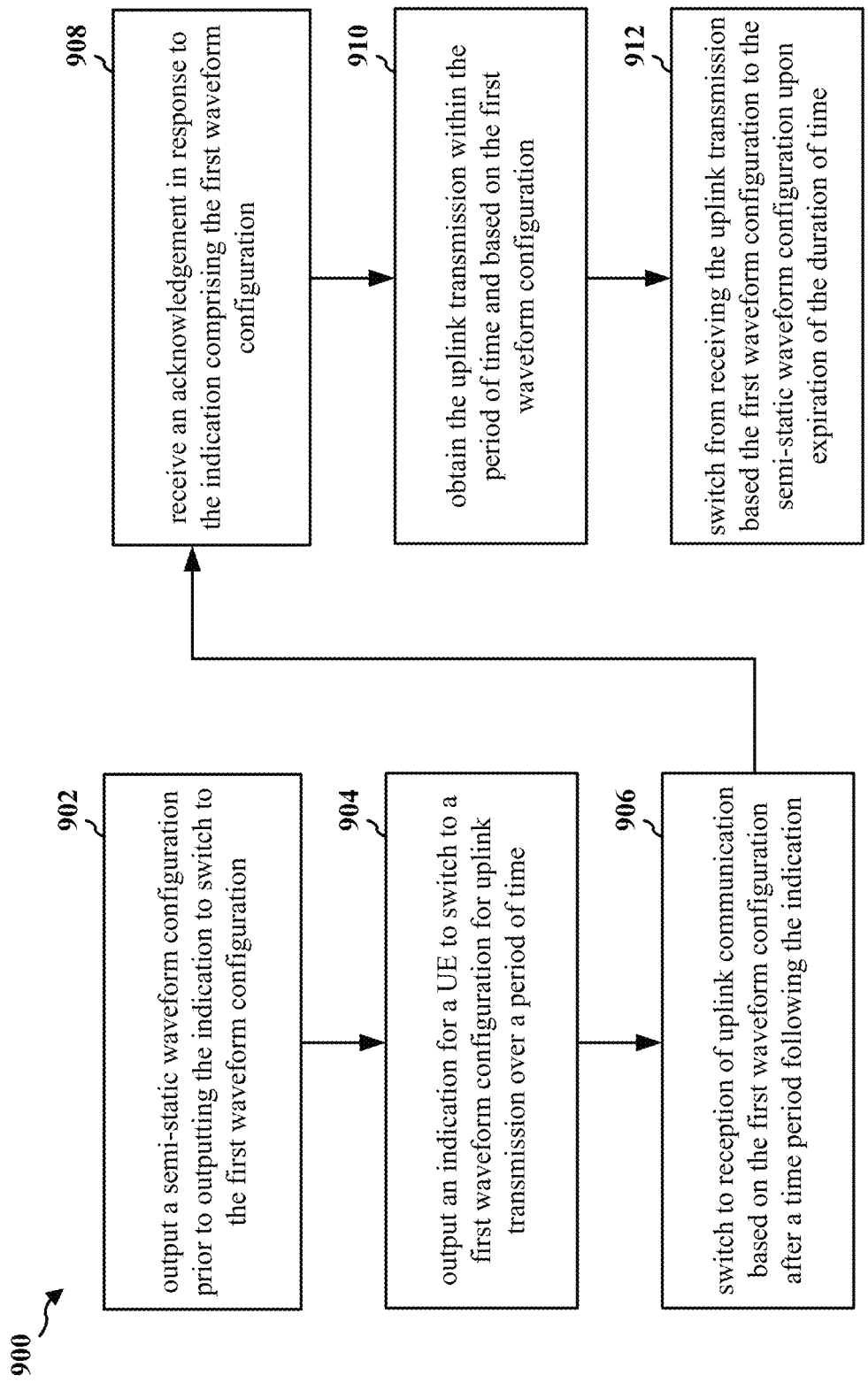
FIG. 9 is a flowchart of a method of wireless communication.

FIG. 9 is a flowchart 900 of a method of wireless communication. The method may be performed by a base station (e.g., the base station 102; the network entity 1002. One or more of the illustrated operations may be omitted, transposed, or contemporaneous. The method may allow a network entity to dynamically indicate a UE to enable or disable transform precoding.

At 902, the network entity may output a semi-static waveform configuration. For example, 902 may be performed by configuration component 199 of network entity 1002. The network entity may output the semi-static waveform configuration prior to outputting an indication to switch to a first waveform configuration. In some aspects, the first waveform configuration may be configured to expire after a duration of time.

At 904, the network entity may output an indication for a user equipment (UE) to switch to a first waveform configuration for uplink transmission over a period of time. For example, 904 may be performed by configuration component 199 of network entity 1002. In some aspects, the indication may be comprised within a group common DCI, a UE-specific DCI, or a MAC-CE. In some aspects, the first waveform configuration may comprise at least one of a filtering configuration or a pulse shape. In some aspects, the indication may comprise an enabling or disabling of a transform precoding. The first waveform configuration may be for CP-OFDM or DFT-s-OFDM. The first waveform configuration may be associated with a subset of uplink transmissions. The first waveform configuration may be associated with a single layer MIMO or a multi-layer MIMO. In some aspects, the first waveform configuration may be associated with a current BWP.

At 906, the network entity may switch to reception of uplink communication based on the first waveform configuration. For example, 906 may be performed by configuration component 199 of network entity 1002. The network entity may switch to reception of uplink communication based on the first waveform configuration after a time period following the indication. In some aspects, the time period may comprise a processing time to switch to the first waveform configuration.

At 908, the network entity may receive an ACK in response to the indication comprising the first waveform configuration. For example, 908 may be performed by configuration component 199 of network entity 1002. The network entity may receive the ACK in response to the transmission of the indication comprising the first waveform configuration. The network entity may receive the ACK from the UE. In some aspects, activation of the first waveform configuration may be based on a time of transmission of the acknowledgment.

At 910, the network entity may obtain the uplink transmission within the period of time. For example, 910 may be performed by configuration component 199 of network entity 1002. The network entity may obtain the uplink transmission within the period of time and based on the first waveform configuration.

At 912, the network entity may switch from receiving the uplink transmission based on the first waveform configuration to the semi-static waveform configuration. For example, 912 may be performed by configuration component 199 of network entity 1002. The network entity may switch from receiving the uplink transmission based on the first waveform configuration to the semi-static waveform configuration upon expiration of the duration of time. In some aspects, the duration of time may be preconfigured, configured via RRC signaling, or indicated within the indication. In some aspects, the duration of time may be comprised of at least one of at least one time slot, at least one OFDM symbol, or an absolute period of time.

Figure 10:
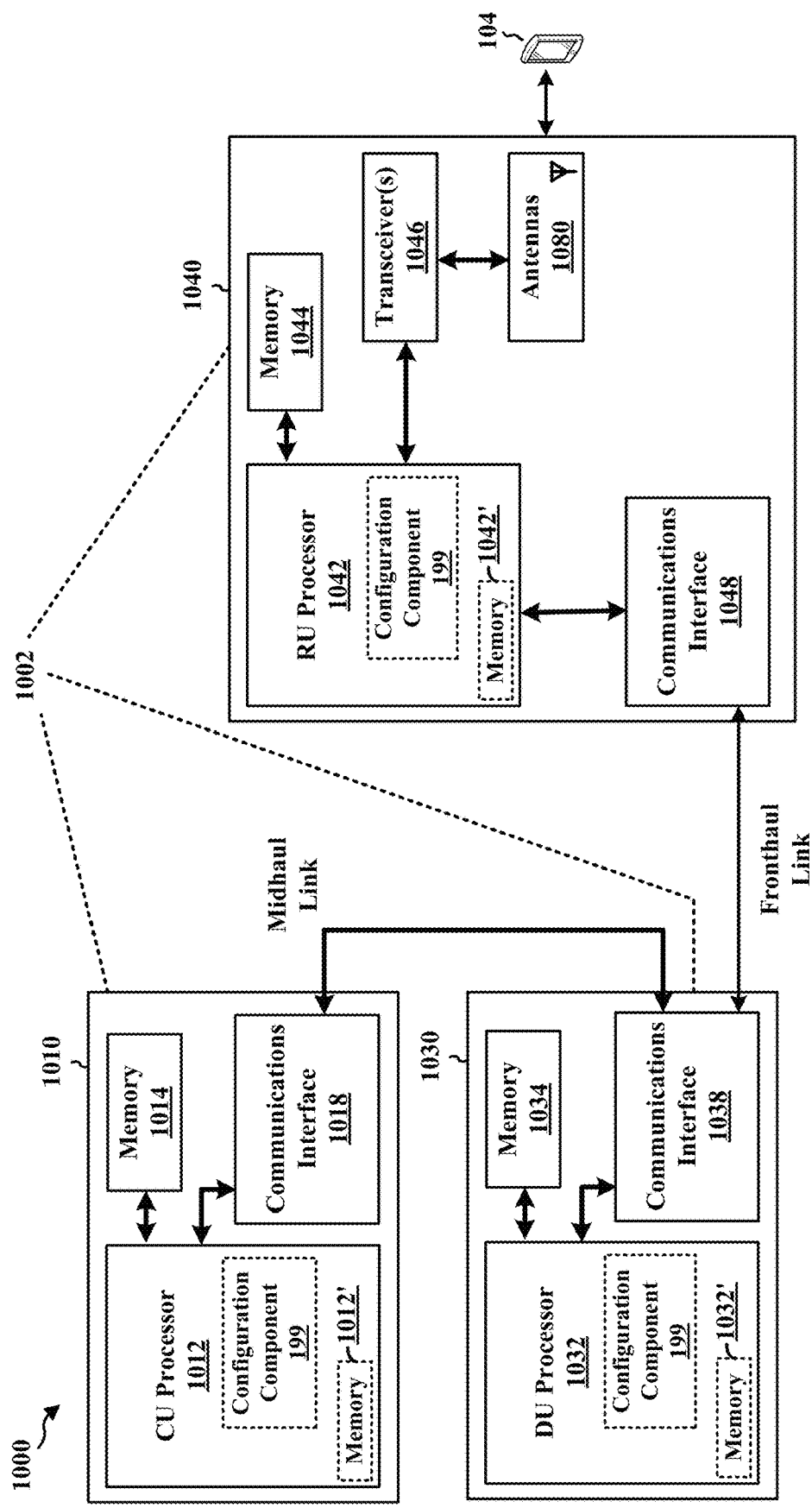
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to output an indication for a UE to switch to a first waveform configuration for uplink transmission over a period of time; and obtain the uplink transmission within the period of time and based on the first waveform configuration. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for outputting an indication for a user equipment (UE) to switch to a first waveform configuration for uplink transmission over a period of time. The network entity includes means for obtaining the uplink transmission within the period of time and based on the first waveform configuration. The network entity further includes means for outputting a semi-static waveform configuration prior to outputting the indication to switch to the first waveform configuration. The first waveform configuration is configured to expire after a duration of time. The network entity further includes means for switching from receiving the uplink transmission based the first waveform configuration to the semi-static waveform configuration upon expiration of the duration of time. The network entity further includes means for switching to reception of uplink communication based on the first waveform configuration after a time period following the indication. The time period comprises a processing time to switch to the first waveform configuration. The network entity further includes means for receiving an acknowledgement in response to the indication comprising the first waveform configuration. Activation of the first waveform configuration is based on a time of transmission of the acknowledgement. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising receiving an indication to switch to a first waveform configuration for uplink transmission over a period of time; and transmitting the uplink transmission based on the first waveform configuration during the period of time.

Aspect 2 is the method of Aspect 1, further includes that the indication is received in a group common DCI, a UE-specific DCI, or a MAC-CE.

Aspect 3 is the method of any of Aspects 1 and 2, further includes that the first waveform configuration comprises at least one of a filtering configuration or a pulse shape.

Aspect 4 is the method of any of Aspects 1-3, further includes that the indication comprises enabling or disabling of a transform precoding.

Aspect 5 is the method of any of Aspects 1-4, further includes that the first waveform configuration is for CP-OFDM or DFT-s-OFDM.

Aspect 6 is the method of any of Aspects 1-5, further including receiving a semi-static waveform configuration prior to receiving the indication to switch to the first waveform configuration, wherein the first waveform configuration is configured to expire after a duration of time; and switching from the first waveform configuration to the semi-static waveform configuration upon expiration of the duration of time.

Aspect 7 is the method of any of Aspects 1-6, further includes that the duration of time is preconfigured, configured via RRC signaling, or indicated within the indication, wherein the duration of time is comprised of at least one of at least one time slot, at least one OFDM symbol, or an absolute period of time.

Aspect 8 is the method of any of Aspects 1-7, further including switching to uplink communication based on the first waveform configuration after a time period following receipt of the indication, wherein the time period comprises a processing time to switch to the first waveform configuration.

Aspect 9 is the method of any of Aspects 1-8, further includes that the first waveform configuration is associated with a subset of uplink transmissions.

Aspect 10 is the method of any of Aspects 1-9, further includes that the first waveform configuration is associated with a single layer MIMO or a multi-layer MIMO.

Aspect 11 is the method of any of Aspects 1-10, further includes that to receive a configured grant of uplink resources, wherein to transmit the uplink transmission further includes transmitting the uplink transmission using one or more uplink resources of the configured grant and with the first waveform configuration based on the uplink transmission corresponding to the subset of the uplink transmissions or based on an additional indication in the configured grant enabling waveform switching or transform precoding switching.

Aspect 12 is the method of any of Aspects 1-11, further includes that transmitting the uplink transmission based on the first waveform configuration includes transmitting the uplink transmission with a change of one or more uplink transmission parameters, wherein the one or more uplink transmission parameters includes at least one of a demodulation reference signal parameter, a phase tracking reference signal configuration, or a contiguous resource block allocation.

Aspect 13 is the method of any of Aspects 1-12, further including switching to the first waveform configuration for a BWP in response to reception of the indication.

Aspect 14 is the method of any of Aspects 1-13, further including transmitting an acknowledgement in response to the indication comprising the first waveform configuration; and activating of the first waveform configuration at an activation time based on transmission of the acknowledgement.

Aspect 15 is an apparatus for wireless communication at a UE including at least one processor coupled to a memory and at least one transceiver, the at least one processor configured to implement any of Aspects 1-14.

Aspect 16 is an apparatus for wireless communication at a UE including means for implementing any of Aspects 1-14.

Aspect 17 is a computer-readable medium storing computer executable code, where the code when executed by a processor causes the processor to implement any of Aspects 1-14.

Aspect 18 is a method for wireless communication at a network node comprising outputting an indication for a UE to switch to a first waveform configuration for uplink transmission over a period of time; and obtaining the uplink transmission within the period of time and based on the first waveform configuration.

Aspect 19 is the method of Aspect 18, further includes that the indication is comprised in a group common DCI, a UE-specific DCI, or a MAC-CE.

Aspect 20 is the method of any of Aspects 18 and 19, further includes that the first waveform configuration comprises at least one of a filtering configuration or a pulse shape.

Aspect 21 is the method of any of Aspects 18-20, further includes that the indication comprises enabling or disabling of a transform precoding.

Aspect 22 is the method of any of Aspects 18-21, further includes that the first waveform configuration is for CP-OFDM or DFT-s-OFDM.

Aspect 23 is the method of any of Aspects 18-22, further including outputting a semi-static waveform configuration prior to outputting the indication to switch to the first waveform configuration, wherein the first waveform configuration is configured to expire after a duration of time; and switching from receiving the uplink transmission based the first waveform configuration to the semi-static waveform configuration upon expiration of the duration of time.

Aspect 24 is the method of any of Aspects 18-23, further includes that the duration of time is preconfigured, configured via RRC signaling, or indicated within the indication.

Aspect 25 is the method of any of Aspects 18-24, further includes that the duration of time is comprised of at least one of at least one time slot, at least one OFDM symbol, or an absolute period of time.

Aspect 26 is the method of any of Aspects 18-25, further including switching to reception of uplink communication based on the first waveform configuration after a time period following the indication, wherein the time period comprises a processing time to switch to the first waveform configuration.

Aspect 27 is the method of any of Aspects 18-26, further includes that the first waveform configuration is associated with a subset of uplink transmissions.

Aspect 28 is the method of any of Aspects 18-27, further includes that the first waveform configuration is associated with a single layer MIMO or a multi-layer MIMO, wherein the first waveform configuration further comprises a change of one or more uplink transmission parameters, wherein the first waveform configuration is associated with a current BWP.

Aspect 29 is the method of any of Aspects 18-28, further including receiving an acknowledgement in response to the indication comprising the first waveform configuration, wherein activation of the first waveform configuration is based on an activation time of transmission of the acknowledgement.

Aspect 30 is an apparatus for wireless communication at a network node including at least one processor coupled to a memory and at least one transceiver, the at least one processor configured to implement any of Aspects 18-29.

Aspect 31 is an apparatus for wireless communication at a network node including means for implementing any of Aspects 18-29.

Aspect 32 is a computer-readable medium storing computer executable code, where the code when executed by a processor causes the processor to implement any of Aspects 18-29.

What is claimed is:

1. An apparatus for wireless communication at a user equipment (UE), comprising:
   memory; and
   at least one processor coupled to the memory and, based at least in part on information stored in the memory, the at least one processor is configured to:
      receive a semi-static waveform configuration indicating a semi-statically indicated waveform;
      receive, after receiving the semi-static waveform configuration, an indication to switch to a first waveform configuration for uplink transmission during a time window of validity, wherein the switch to the first waveform configuration is configured to expire at an end of the time window of validity, and wherein the time window of validity is one of preconfigured or configured via radio resource control (RRC) signaling before receiving the indication;
      transmit the uplink transmission based on the first waveform configuration during the time window of validity; and
      switch, based on an expiration of the time window of validity, from the first waveform configuration to the semi-statically indicated waveform.

2. The apparatus of claim 1, further comprising a transceiver coupled to the at least one processor.

3. The apparatus of claim 1, wherein the indication is received in a group common downlink control information (DCI) or a medium access control (MAC) control element (CE) (MAC-CE).

4. The apparatus of claim 1, wherein the first waveform configuration comprises at least one of a filtering configuration or a pulse shape.

5. The apparatus of claim 1, wherein the indication comprises enabling or disabling of a transform precoding.

6. The apparatus of claim 1, wherein the first waveform configuration is for cyclic prefix orthogonal frequency division multiplexing (CP-OFDM) or discrete Fourier transform spread orthogonal frequency division multiplexing (DFT-s-OFDM).

7. The apparatus of claim 1, wherein the time window of validity is one of preconfigured or configured via the RRC signaling to be at least one of a first number of time slots, a second number of orthogonal frequency division multiplexing (OFDM) symbols, or an absolute period of time.

8. The apparatus of claim 1, wherein the at least one processor is further configured to:
   switch to uplink communication based on the first waveform configuration after a preconfigured time period following receipt of the indication, wherein the preconfigured time period is based on a processing time to switch to the first waveform configuration.

9. The apparatus of claim 1, wherein the first waveform configuration is associated with a subset of uplink transmissions.

10. The apparatus of claim 9, wherein the first waveform configuration is associated with a single layer multiple input multiple output (MIMO) or a multi-layer MIMO.

11. The apparatus of claim 9, wherein the first waveform configuration is associated with a transform precoding and the subset of uplink transmissions comprises uplink transmissions for which the transform precoding is allowed, and wherein the at least one processor is further configured to:
receive a configured grant for a set of uplink resources, wherein to transmit the uplink transmission, the at least one processor is further configured to at least one of:
transmit, based on a first configuration of the configured grant associated with the subset of uplink transmissions, the uplink transmission using one or more uplink resources of the set of uplink resources and based on the first waveform configuration; or
transmit, based on a second configuration of the configured grant not associated with the subset of uplink transmissions, the uplink transmission using the one or more uplink resources of the set of uplink resources and based on the semi-statically indicated waveform.

12. The apparatus of claim 1, wherein to transmit the uplink transmission based on the first waveform configuration, the at least one processor is configured to:
transmit the uplink transmission with a change of one or more uplink transmission parameters associated with the first waveform configuration, wherein the one or more uplink transmission parameters includes at least one of a demodulation reference signal parameter or a phase tracking reference signal configuration.

13. The apparatus of claim 1, wherein the at least one processor is further configured to:
switch to the first waveform configuration for a current bandwidth part (BWP) in response to reception of the indication.

14. The apparatus of claim 1, wherein the at least one processor is further configured to:
transmit an acknowledgement in response to the indication comprising the first waveform configuration; and
activate the first waveform configuration at an activation time based on transmission of the acknowledgement.

15. A method of wireless communication at a user equipment (UE), comprising:
receiving a semi-static waveform configuration indicating a semi-statically indicated waveform;
receiving, after receiving the semi-static waveform configuration, an indication to switch to a first waveform configuration for uplink transmission during a time window of validity, wherein the switch to the first waveform configuration is configured to expire at an end of the time window of validity, and wherein the time window of validity is one of preconfigured or configured via radio resource control (RRC) signaling before receiving the indication;
transmitting the uplink transmission based on the first waveform configuration during the time window of validity; and
switching, based on an expiration of the time window of validity, from the first waveform configuration to the semi-statically indicated waveform.

16. The method of claim 15, wherein the indication is received in a group common downlink control information (DCI) or a medium access control (MAC) control element (CE) (MAC-CE).

17. The method of claim 15, wherein the first waveform configuration comprises at least one of a filtering configuration or a pulse shape.

18. The method of claim 15, wherein the indication comprises enabling or disabling of a transform precoding.

19. The method of claim 15, wherein the first waveform configuration is for cyclic prefix orthogonal frequency division multiplexing (CP-OFDM) or discrete Fourier transform spread orthogonal frequency division multiplexing (DFT-s-OFDM).

20. The method of claim 15, wherein the time window of validity is one of preconfigured or configured via the RRC signaling to be at least one of a first number of time slots, a second number of orthogonal frequency division multiplexing (OFDM) symbols, or an absolute period of time.

21. The method of claim 15, further comprising:
switching to uplink communication based on the first waveform configuration after a preconfigured time period following receipt of the indication, wherein the preconfigured time period is based on a processing time to switch to the first waveform configuration.

22. The method of claim 15, wherein the first waveform configuration is associated with a subset of uplink transmissions.

23. The method of claim 22, wherein the first waveform configuration is associated with a single layer multiple input multiple output (MIMO) or a multi-layer MIMO.

24. The method of claim 22, wherein the first waveform configuration is associated with a transform precoding, the method further comprising:
receiving a configured grant for a set of uplink resources, wherein transmitting the uplink transmission, comprises one of:
transmitting, based on a first configuration of the configured grant allowing the transform precoding, the uplink transmission using one or more uplink resources of the set of uplink resources and based on the first waveform configuration; or
transmitting, based on a second configuration of the configured grant not allowing the transform precoding, the uplink transmission using the one or more uplink resources of the set of uplink resources and based on the semi-statically indicated waveform.

25. The method of claim 15, wherein transmitting the uplink transmission based on the first waveform configuration includes transmitting the uplink transmission with a change of one or more uplink transmission parameters associated with the first waveform configuration, wherein the one or more uplink transmission parameters includes at least one of a demodulation reference signal parameter or a phase tracking reference signal configuration.

26. The method of claim 15, further comprising:
switching to the first waveform configuration for a current bandwidth part (BWP) in response to reception of the indication.

27. The method of claim 15, further comprising:
transmitting an acknowledgement in response to the indication comprising the first waveform configuration; and
activating the first waveform configuration at an activation time based on transmission of the acknowledgement.

28. A non-transitory computer-readable medium storing computer executable code, where the code when executed by a processor causes the processor to:
receive a semi-static waveform configuration indicating a semi-statically indicated waveform;

receive, after receiving the semi-static waveform configuration, an indication to switch to a first waveform configuration for uplink transmission during a time window of validity, wherein the switch to the first waveform configuration is configured to expire at an end of the time window of validity, and wherein the time window of validity is one of preconfigured or configured via radio resource control (RRC) signaling before receiving the indication;

transmit the uplink transmission based on the first waveform configuration during the time window of validity; and switch, based on an expiration of the time window of validity, from the first waveform configuration to the semi-statically indicated waveform.

29. The non-transitory computer-readable medium of claim 28, wherein the first waveform configuration is associated with a subset of uplink transmissions for which a transform precoding is allowed, wherein the first waveform configuration is associated with a transform precoding, and where the code when executed by a processor further causes the processor to:

receive a configured grant for a set of uplink resources, wherein to transmit the uplink transmission, the code when executed by a processor further causes the processor to at least one of:

transmit, based on a first configuration of the configured grant associated with the subset of uplink transmissions, the uplink transmission using one or more uplink resources of the set of uplink resources and based on the first waveform configuration; or transmit, based on a second configuration of the configured grant not associated with the subset of uplink transmissions, the uplink transmission using one or more uplink resources of the set of uplink resources and based on the semi-statically indicated waveform.

30. An apparatus for wireless communication at a network node including:

means for receiving a semi-static waveform configuration indicating a semi-statically indicated waveform;

means for receiving, after receiving the semi-static waveform configuration, an indication to switch to a first waveform configuration for uplink transmission during a time window of validity, wherein the switch to the first waveform configuration is configured to expire at an end of the time window of validity, and wherein the time window of validity is one of preconfigured or configured via radio resource control (RRC) signaling before receiving the indication;

means for transmitting the uplink transmission based on the first waveform configuration during the time window of validity; and means for switching, based on an expiration of the time window of validity, from the first waveform configuration to the semi-statically indicated waveform.

* * * * *